US012226891B2

(12) United States Patent
Holland et al.

(10) Patent No.: US 12,226,891 B2
(45) Date of Patent: Feb. 18, 2025

(54) ADJUSTABLE TOOL HOLDER FOR A GUN-SHAPED POWER TOOL

(71) Applicant: Toyota Motor Engineering & Manufacturing North America, Inc., Plano, TX (US)

(72) Inventors: Lloyd Rodney Holland, Georgetown, KY (US); Scottie Len Foster, Lawrenceburg, KY (US); Bradley Joseph Garcia, Louisville, KY (US); Michael Christopher Greenlee, Paris, KY (US); Jeffrey Lee James, Mount Sterling, KY (US); Bradley Dale Newcomb, Lancaster, KY (US); Andrew Barnum Novian, Winchester, KY (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/326,691

(22) Filed: May 31, 2023

(65) Prior Publication Data

US 2024/0399559 A1 Dec. 5, 2024

(51) Int. Cl.
*B25H 3/00* (2006.01)
*B25H 3/04* (2006.01)

(52) U.S. Cl.
CPC ............... *B25H 3/006* (2013.01); *B25H 3/00* (2013.01); *B25H 3/04* (2013.01)

(58) Field of Classification Search
CPC ............. B25H 3/00; B25H 3/006; B25H 3/04
(Continued)

(56) References Cited

U.S. PATENT DOCUMENTS

| | | | | |
|---|---|---|---|---|
| 4,763,797 A * | 8/1988 | Egan | .................... | A63C 11/028 211/89.01 |
| 4,798,298 A * | 1/1989 | Ursetta | .................. | A47B 81/00 D6/552 |

(Continued)

FOREIGN PATENT DOCUMENTS

| | | | |
|---|---|---|---|
| CN | 107283380 A * | 10/2017 | ............... B25H 3/04 |
| CN | 114144284 A * | 3/2022 | ............. B25H 3/003 |
| WO | WO-2018213818 A1 * | 11/2018 | ........... A47B 47/027 |

OTHER PUBLICATIONS

Astro. "Astro Pneumatic GFH1000 Spray Gun Holder and Removable Strainer", Retrieved from the Internet: <https://www.amazon.com/Astro-Pneumatic-GFH1000-Removable-Strainer/dp/B0082LFUFE>, retrieved May 30, 2023 (5 pages).

(Continued)

*Primary Examiner* — Taylor Morris
(74) *Attorney, Agent, or Firm* — Christopher G. Darrow; Darrow Mustafa PC

(57) ABSTRACT

A tool holder for a gun-shaped power tool includes a base including a first slot and a second slot extending parallel to the first slot, a first support member adjustably securable along the first slot and along a first side of the base, and a second support member adjustably securable along the second slot and along the first side of the base. A tool bit and/or a barrel of the tool may be supported by surfaces of the support members when the tool is stored in the tool holder, so that a grip of the tool is readily accessible by a user. The power tool holder provides a structure for ergonomically positioning and storing a gun-shaped power tool, improving the ease and speed of access of the tool during assembly operations.

11 Claims, 5 Drawing Sheets

(58) Field of Classification Search
USPC ........................................ 211/64, 70.6, 94.01
See application file for complete search history.

(56) References Cited

U.S. PATENT DOCUMENTS

| | | | | | |
|---|---|---|---|---|---|
| 4,805,784 | A * | 2/1989 | Solheim | A47F 5/0846 | 211/94.01 |
| 5,183,164 | A * | 2/1993 | Heinzle | A63C 11/028 | 211/70.5 |
| 5,301,823 | A * | 4/1994 | Kingery | A47F 5/0876 | 211/175 |
| 5,740,927 | A * | 4/1998 | Yemini | A47F 5/0853 | 211/94.01 |
| 5,827,487 | A * | 10/1998 | Holmes | A61L 2/26 | 206/483 |
| 6,152,312 | A * | 11/2000 | Nava | A47G 25/06 | 211/94.01 |
| 6,273,277 | B1 * | 8/2001 | Geldenhuys | B25H 3/04 | 211/115 |
| 6,281,417 | B1 * | 8/2001 | Ladao | A47F 7/0035 | 84/421 |
| 6,305,557 | B1 * | 10/2001 | Brooks | B25H 3/04 | 211/94.01 |
| 6,349,507 | B1 * | 2/2002 | Muellerleile | A47F 5/0846 | 108/106 |
| 6,564,949 | B1 * | 5/2003 | Saathoff | B25H 3/006 | 211/94.01 |
| 6,600,107 | B1 * | 7/2003 | Wright | H04Q 1/06 | 174/101 |
| 6,637,605 | B2 * | 10/2003 | Ernst | B25H 3/003 | 206/378 |
| 7,028,854 | B1 * | 4/2006 | Londrico | A47B 81/005 | 211/89.01 |
| 7,229,057 | B2 * | 6/2007 | Cavell | F16M 13/027 | 248/580 |
| 7,290,311 | B2 * | 11/2007 | Vosbikian | B65D 71/0096 | 16/427 |
| 7,600,720 | B2 * | 10/2009 | Vogel | H05K 7/1491 | 248/49 |
| 7,669,723 | B2 * | 3/2010 | Kao | B25H 3/04 | 206/349 |
| 8,197,304 | B2 * | 6/2012 | Hummel | B24D 15/06 | 451/380 |
| 8,336,709 | B1 * | 12/2012 | Geibel | B25H 3/06 | 206/378 |
| 8,522,986 | B2 * | 9/2013 | Kitchen | B25H 3/04 | 248/220.31 |
| 9,180,591 | B2 * | 11/2015 | McLean | A47B 83/001 | |
| 9,193,063 | B2 * | 11/2015 | Huang | F16B 2/14 | |
| 9,581,782 | B2 * | 2/2017 | Abby | H04Q 1/064 | |
| 9,656,385 | B1 * | 5/2017 | Kao | A47F 7/0035 | |
| 9,918,568 | B1 * | 3/2018 | Blake | A47G 25/0678 | |
| 9,936,807 | B2 * | 4/2018 | Ryan | A63B 71/0036 | |
| 10,149,540 | B2 * | 12/2018 | Corless | A47B 96/067 | |
| 10,405,676 | B1 * | 9/2019 | Underwood | A47F 5/0846 | |
| 10,486,300 | B2 * | 11/2019 | Lopez | B25H 3/003 | |
| 10,542,822 | B2 * | 1/2020 | Blake | A47C 12/00 | |
| 10,629,335 | B2 * | 4/2020 | Rouleau | H01B 13/01209 | |
| 11,161,234 | B2 * | 11/2021 | Kukucka | B25H 3/003 | |
| 11,358,246 | B2 * | 6/2022 | Bohle, II | B25J 15/0416 | |
| 11,369,216 | B2 * | 6/2022 | Fleega | A47F 5/0823 | |
| 2005/0194330 | A1 * | 9/2005 | Ziske | B25H 3/04 | 211/59.1 |
| 2006/0234846 | A1 * | 10/2006 | Tucker | B25H 3/04 | 483/26 |
| 2007/0170220 | A1 * | 7/2007 | Fragassi, III | B25H 3/006 | 224/660 |
| 2016/0331131 | A1 * | 11/2016 | Ghaeni | A47F 5/0823 | |

OTHER PUBLICATIONS

TCP Global. "TCP Global Wall Mount Gravity Feed Spray Gun Holder—Attach to Spray Booth Walls & Work Stations", Retrieved from the Internet: <https://www.amazon.com/dp/B0733VPWG5/>, retrieved May 30, 2023 (6 pages).

Guardair. "Guardair 200A30 Gunslinger Air Gun Holder, 3.13 Inch", Retrieved from the Internet: <https://www.amazon.com/Guardair-200A30-Gunslinger-Air-Holder/dp/B00208DYIU?th=1:>, retrieved May 30, 2023 (6 pages).

Astro. "Astro Pneumatic Gravity Feed Spray Gun Holder—2 pc.", Retrieved from the Internet: <https://www.toolsusa.com/mm5/merchant.mvc?Screen=PROD&Product_Code=astro-pneumatic-gravity-feed-spray-gun-holder-6308>, retrieved May 30, 2023 (3 pages).

Hongzer. "Hot Air Gun Clamp Kit, Hot Air Gun and Desktop Hand Held Heat Gun Holder Platform for BGA Rework Reballing Station", Retrieved from the Internet: <https://www.amazon.co.uk/Hot-Air-Gun-Clamp-Desktop-Platform-Reballing-Station/dp/B07V4VSJ93>, retrieved May 30, 2023 (4 pages).

Oddshopltd. "Pneumatic Air Tool 6 Gun Rack Holder—Shop Garage Wall Storage Organizer Steel", Retrieved from the Internet: <https://www.ebay.com/itm/114499604111>, retrieved May 30, 2023 (4 pages).

Aircraft Tool Supply Company. "Locking Air Tool Holder", retrieved from the Internet: <https://www.aircraft-tool.com/shop/detail.aspx?id=49960>, retrieved May 30, 2023 (2 pages).

* cited by examiner

ADJUSTABLE TOOL HOLDER FOR A GUN-SHAPED POWER TOOL

TECHNICAL FIELD

The present invention relates to implements for a holding power tool in a user-accessible location near a work station.

BACKGROUND

Many power tools used in assembly operations are "gun-shaped", having a hand grip for grasping and manipulation by a user, and a barrel from which a tool (such as a drill bit) extends. Such tools may be stored in a tool holder mounted close to a work station where the tool is to be used. A conventional holder for a gun-shaped power tools may typically be formed as a cylindrical receptacle having a pair of open ends. A user may insert the tool bit and barrel into one open end for storage when the tool is not in use. To help position the hand grip for convenient user access, a size of the tool-receiving open end may be restricted to about 35 mm in diameter.

However, in some cases, the tool bit extending from the barrel has a length that is equal to or greater than a length of the remainder of the power tool. It is sometimes difficult for team members to align a longer tool bit with a receptacle opening of this size when returning the tool to the holder. In addition, when the user grasps the tool, the user may have difficulty removing the tool from the holder due to the need to pull an extended-length tool bit out from the receptacle. Because of tool insertion and withdrawal difficulties, much time may be wasted in simply extracting the tool from the tool holder and positioning the tool in the tool holder for storage.

SUMMARY

In one aspect of the embodiments described herein, a tool holder for a gun-shaped power tool is provided. The toll holder includes a base including a first slot and a second slot extending parallel to the first slot, a first support member adjustably securable along the first slot and along a first side of the base, and a second support member adjustably securable along the second slot and along the first side of the base.

DETAILED DESCRIPTION

Figure 1:
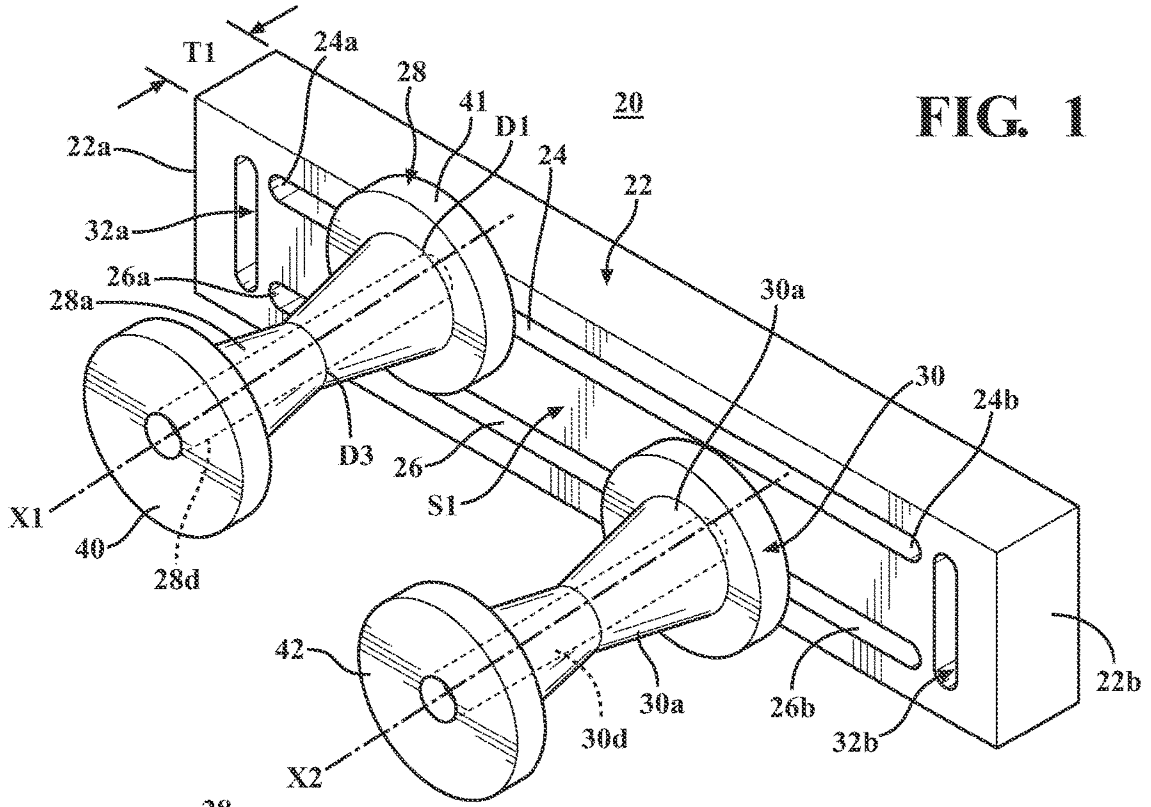
FIG. 1 is a schematic perspective view of a holder for a gun-shaped power tool, in accordance with an embodiment described herein.

Embodiments described herein relate to a tool holder for a gun-shaped power tool. The toll holder includes a base including a first slot and a second slot extending parallel to the first slot, a first support member adjustably securable along the first slot and along a first side of the base, and a second support member adjustably securable along the second slot and along the first side of the base. A tool bit and/or a barrel of the tool may be supported by surfaces of the support members when the tool is stored in the tool holder, so that a grip of the tool is readily accessible by a user. The power tool holder provides a structure for ergonomically positioning and storing a gun-shaped power tool, improving the ease and speed of access of the tool during assembly operations.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Figure 4:
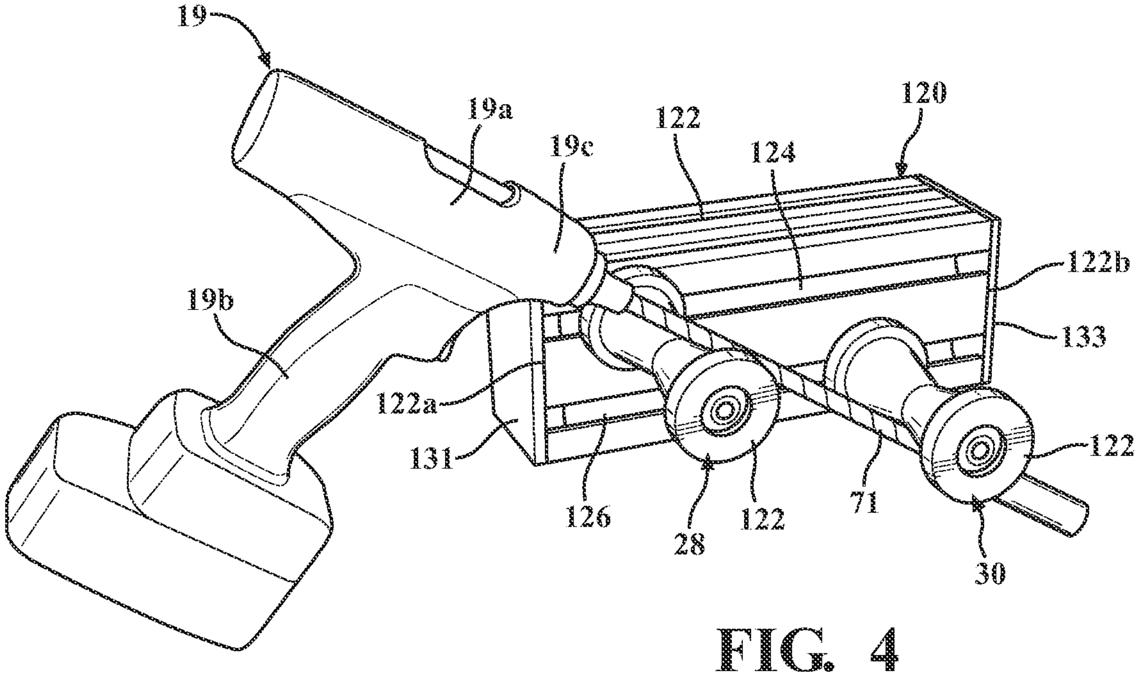
FIG. 4 is a schematic perspective view of another embodiment of the power tool holder, showing a gun-shaped power tool stored in the holder.

Disclosed herein are embodiments of a power tool holder designed to support a gun-shaped pneumatic, electric, hydraulic and/or other power tool. Referring to FIG. 4, the power tool 19 may be "gun-shaped" in that it has body 19*a* comprising a grip 19*b* for grasping in a user's hand, and a "barrel" 19*c* extending from the grip 19*b* and in which a tool bit (such as a drill bit) may be mounted for powered operation by a motor housed in the tool body 19*a*.

Figure 2:
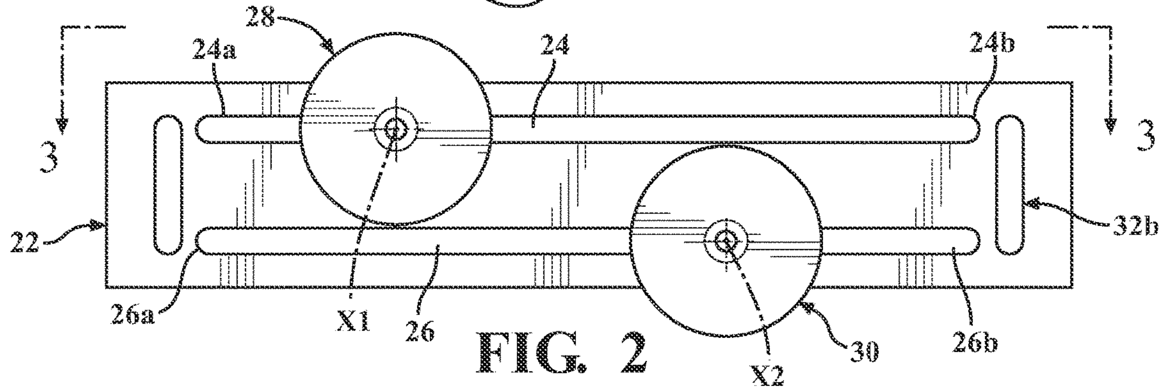
FIG. 2 is a schematic side view of the power tool holder shown in FIG. 1.
Figure 3:
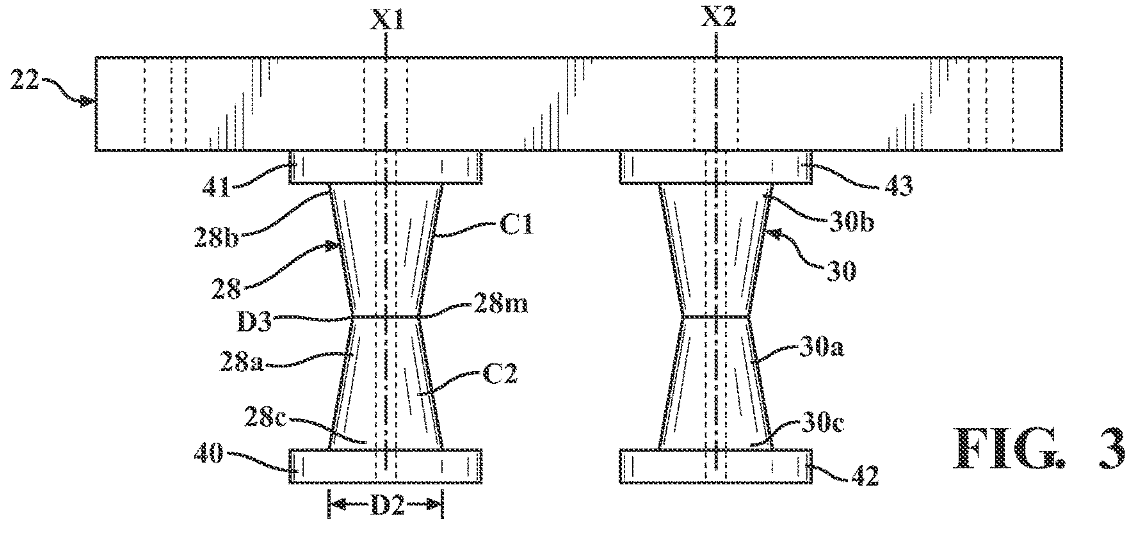
FIG. 3 is a schematic plan view of the power tool holder shown in FIGS. 1 and 2.

FIG. 1 is a schematic perspective view of a tool holder 20 for a gun-shaped power tool, in accordance with an embodiment described herein. FIG. 2 is a schematic side view of the power tool holder 20 shown in FIG. 1. FIG. 3 is a schematic plan view of the power tool holder 20 shown in FIGS. 1 and 2. In one or more arrangements, the tool holder 20 may include a base 22 having a first slot 24 and a second slot 26 extending parallel to the first slot 24. Slots 24 and 26 may be through slots (i.e., slots extending through a thickness Tl of the base 22). A first support member 28 may be structured to be adjustably securable along the first slot 24 and along a first side S1 of the base 22. A second support member 30 may be structured to be adjustably securable along the second slot 26 and along the first side S1 of the base 22. "Adjustably securable" as applied to a support member means that the support member may be moved to a desired position along a respective slot and then secured in the desired position, using a bolt, a spring member, or any other suitable temporary securement method. When it is desired to reposition the support member, the securement may be loosened or removed to allow the support member to be moved along its slot to a new position. Then the securement may be re-applied to fix the support member in the new position.

Referring to FIGS. 1-3, in one or more arrangements, the first slot 24 may have a first end 24*a* spaced apart from a first end 22*a* of the base and a second end 24*b* spaced apart from a second end 22*b* of the base 22 opposite the first end 22*a* of the base 22. Also, the second slot 26 may have a first end 26*a* spaced apart from the first end 22*a* of the base 22 and a second end 26*b* spaced apart from the second end 22*b* of the base 22.

In addition, a pair of attachment through slots 32*a*, 32*b* may be provided near respective opposite ends 22*a*, 22*b* of the base 22. Attachment slots 32*a*, 32*b* may enable the base 22 to be mounted to a wall, workbench, etc. using bolts or other attachment methods. Attachment slot(s) may be positioned at any location(s) along the base 22 where the attachment slots will not interfere with adjustment of the support members 28, 30 along the base 22 and storage and use of any tools on the tool holder 20 after the base 22 has been mounted to a mounting surface.

Figure 5:
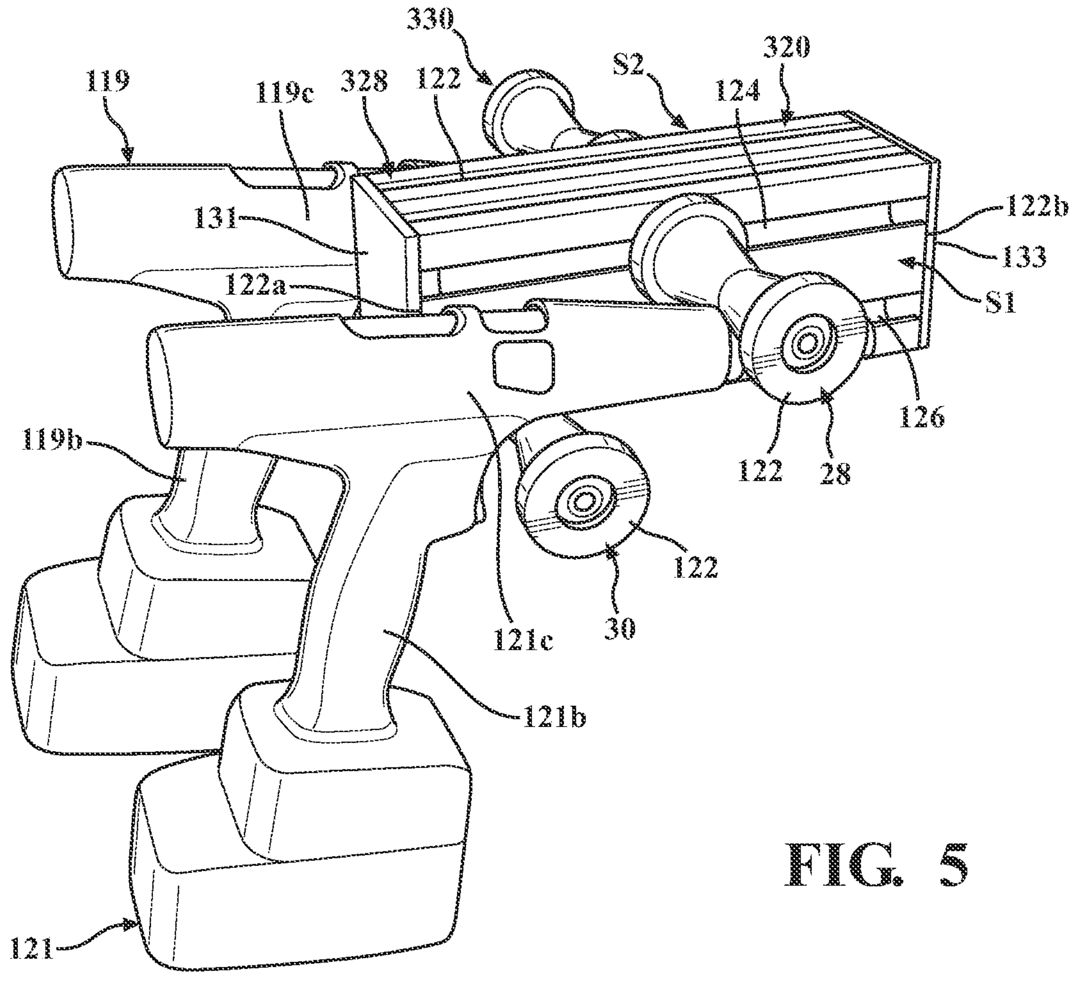
FIG. 5 is a schematic perspective view of yet another embodiment of the power tool holder, showing a pair of gun-shaped power tools stored along different sides of the holder.

Referring to FIGS. 4 and 5, in another embodiment 122 of the base, through slots 124 and 126 may extend all the way to the ends 122*a*, 122*b* of the base 122 so that the slots are open-ended, allowing each of the support members 28 and 30 to exit its respective slot at either end of the slot. To prevent the support members 28 and 30 from exiting the slots at the base first end 122*a*, a first end cap 131 may be attached (either removably or permanently) to the base first end 122*a*. Similarly, to prevent the support members 28 and 30 from exiting the slots at the base second end 122*b*, a second end cap 133 may be attached (either removably or permanently) to the base second end 122*b*.

Referring again to FIGS. 1-3, in one or more arrangements, the first support member 28 may have a body 28*a* with a first end 28*b* positionable relatively closer to the base 22 and a second end 28*c* positioned opposite the first end 28*b*. A central opening 28*d* may extend through the body 28*a*, and a slot axis X1 may extend along the central opening 28*d*. Similarly, the second support member 30 may have a body 30*a* with a first end 30*b* positionable relatively closer to the base 22 and a second end 30*c* positioned opposite the first end 30*b*. A central opening 30*d* may extend through the body 30*a*. A slot axis X2 may extend through the central opening 30*d*. A slot axis of a support member may be an axis passing through the support member and through a respective base slot.

Between the first and second ends 28*b*, 28*c*, the first support member 28 may have a shape defined by a pair of truncated cones C1, C2, with each truncated cone having a relatively smaller diameter portion and a relatively larger diameter portion, and with the truncated conical shapes C1, C2 joined at the relatively smaller diameter portions. In addition, the relatively larger diameter portions of the cones may be positioned at the first and second ends 28*b*, 28*c* of the support member 28.

The body 28*a* may have a maximum outer diameter D1 of the first conical shape C1 positioned at the first end 28*b* of the support member, and a maximum outer diameter D2 of the second conical shape C2 may be positioned at the support member second end 28*c*. In particular arrangements, the maximum outer diameter D1 of the first conical shape C1 may be equal to the maximum outer diameter D2 of the second conical shape C2. The first support member 28 may also have a third outer diameter D3 at a location 28*m* intermediate the first and second ends 28*b*, 28*c*, where the truncated conical shapes C1 and C2 intersect. The third outer diameter D3 may be less than either of the first and second maximum outer diameters D1 and D2.

The support member structure shown in FIGS. 1-3 may operate to bias a power tool supported by the support members 28, 30 toward the intermediate location 28*m*, thereby spacing the power tool apart from the base 22 and allowing more space for gripping and manipulation of the power tool when the tool is mounted on the support members 28, 30 and removed from the support members.

Referring again to FIGS. 1-3, the first support member 28 may have a flange 40 mounted at the first support member second end 28*c*. The flange 40 may have having an outer diameter greater than the support member second end outer diameter D2. The flange 40 may be structured to prevent a portion of a power tool resting on the first support member 28 from sliding and falling off the second end 28*c* of the first support member 28.

In particular arrangements, the first support member 28 may include another flange 41 mounted at the first end 28*b* of the support member. The other flange 41 may have an outer diameter greater than the support member first end outer diameter D1. Provision of a flange at the first end 28*b* as well as at the second end 28*c* of the first support member 28 may enable any of the support member first and second ends to be attached to the base interchangeably, with a flange mounted on the remaining end (i.e., the resulting second end) to prevent a power tool from sliding off the second end 28*c* of the support member 28 as previously described.

The flange(s) 40, 41 may be formed from any material (such as a rubber, metal, or polymer material) suitable for the purposes described herein. The flange(s) may be attached to the respective support member bodies using any suitable means, such as adhesive attachment or interference fits, for example. In one or more arrangements, the second support member 30 may be structured in the same manner as described above for the first support member 28 with, for example, second support member 30 including flanges 42 and 43.

Figure 6:
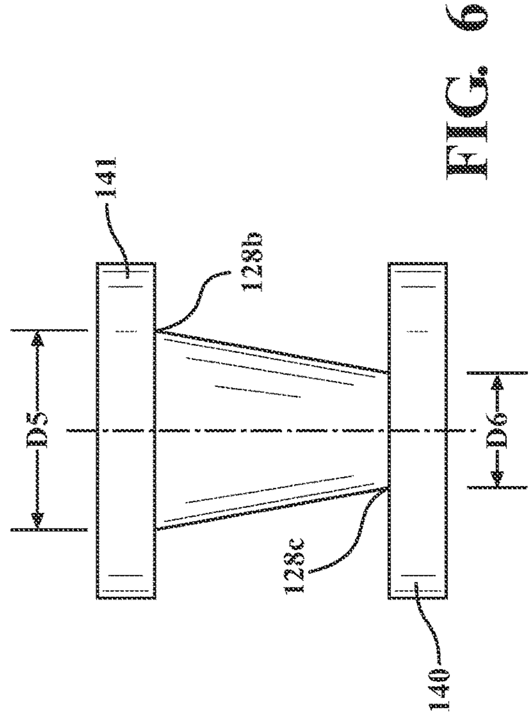
FIG. 6 is a schematic plan view of an alternative embodiment of a support member of the power tool holder.

Referring to FIG. 6, in an alternative embodiment 128 of the support member, the portion of the support member between the first and second ends 128*b* and 128*c* may have a truncated conical structure, with a first, relatively larger diameter portion D5 at the first end 128*b* (i.e., for positioning relatively closer to the base 22) and a second, relatively smaller diameter portion D6 at the second end 128*c*. The support member 128 may also include a flange 140 mounted at the second end 128*c* and (optionally) a flange 141 mounted at the first end 128*b* as previously described. A second support member 130 (not shown) mounted on the tool holder may be structured in the same manner as the first support member 128. The support member structure shown in FIG. 7 may operate to bias a power tool supported by the support members 128, 130 toward the second ends of the support members, at a greatest distance from the base 22. This may allow additional space for gripping and manipulation of the power tool when the tool is mounted on the support members and removed from the support members.

Figure 7:
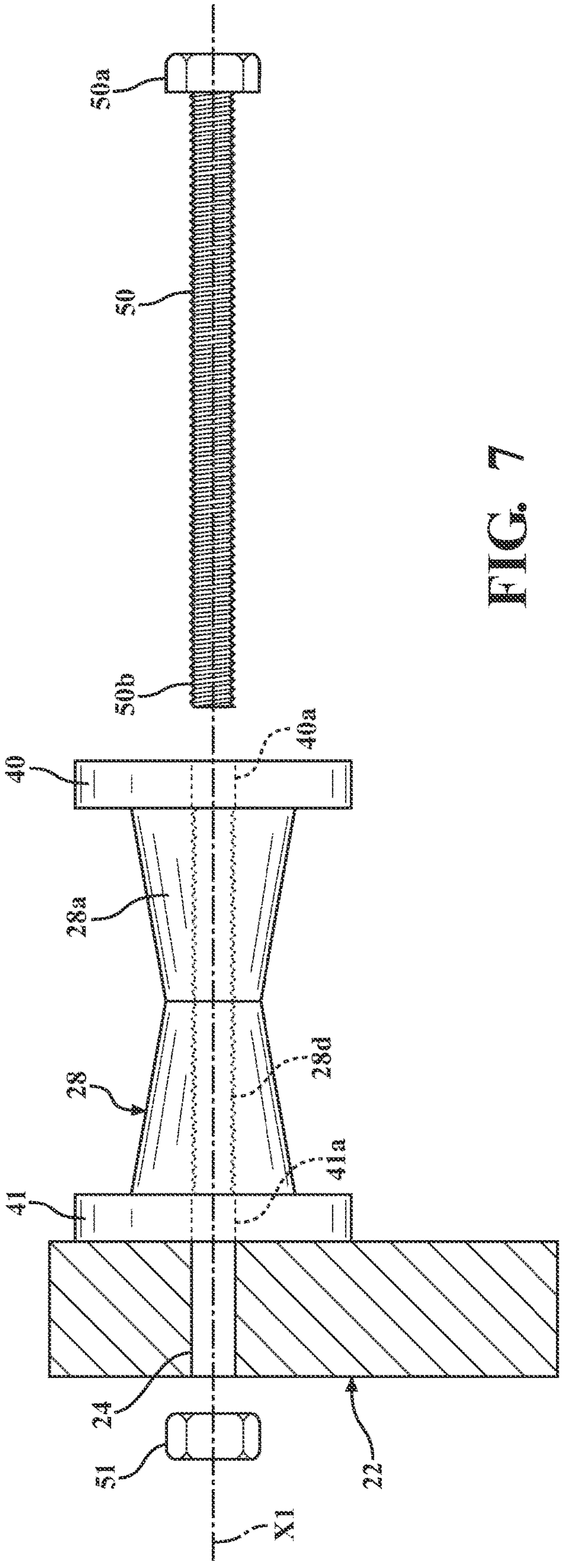
FIG. 7 is a schematic cross-section al end view of power tool holder of FIGS. 1-3, showing one method of securing a support member to a base of the holder.

FIG. 7 shows an example of how a support member as described herein may be secured to the base. FIG. 7 is a schematic cross-sectional end view of a power tool holder 20 as shown in FIGS. 1-3, showing one method of securing the support member to the base 22 of the tool holder 20. A long, externally-threaded bolt 50 may be specified so as to pass through an opening 40*a* provided in flange 40, then through support member central opening 28*d*, through another opening 41*a* formed in flange 41, then through slot 24 formed in the base 22. The bolt 50 may then be secured at an end 50*b* thereof projecting through the base 22 by a nut 51 secured to the bolt end 50*b*. The support member opening 28*d* and/or openings 40*a*, 41*a* provided in flanges 40, 41 may be internally complementarily-threaded along the slot axis X1 of the support member 28, or the support member opening 28*d* and/or openings 40*a*, 41*a* may be unthreaded through clearance holes (for retention by the nut 51).

In an alternative arrangement (not shown), a bolt having threaded portions at each end may extend through the slot 24, the support member 28, and the flanges 40, 41, and complementarily-threaded nuts (not shown) may be attached at each end of the bolt to secure the support member 28 in a desired position along the slot 24. Other support member securement methods may also be used.

Figure 8:
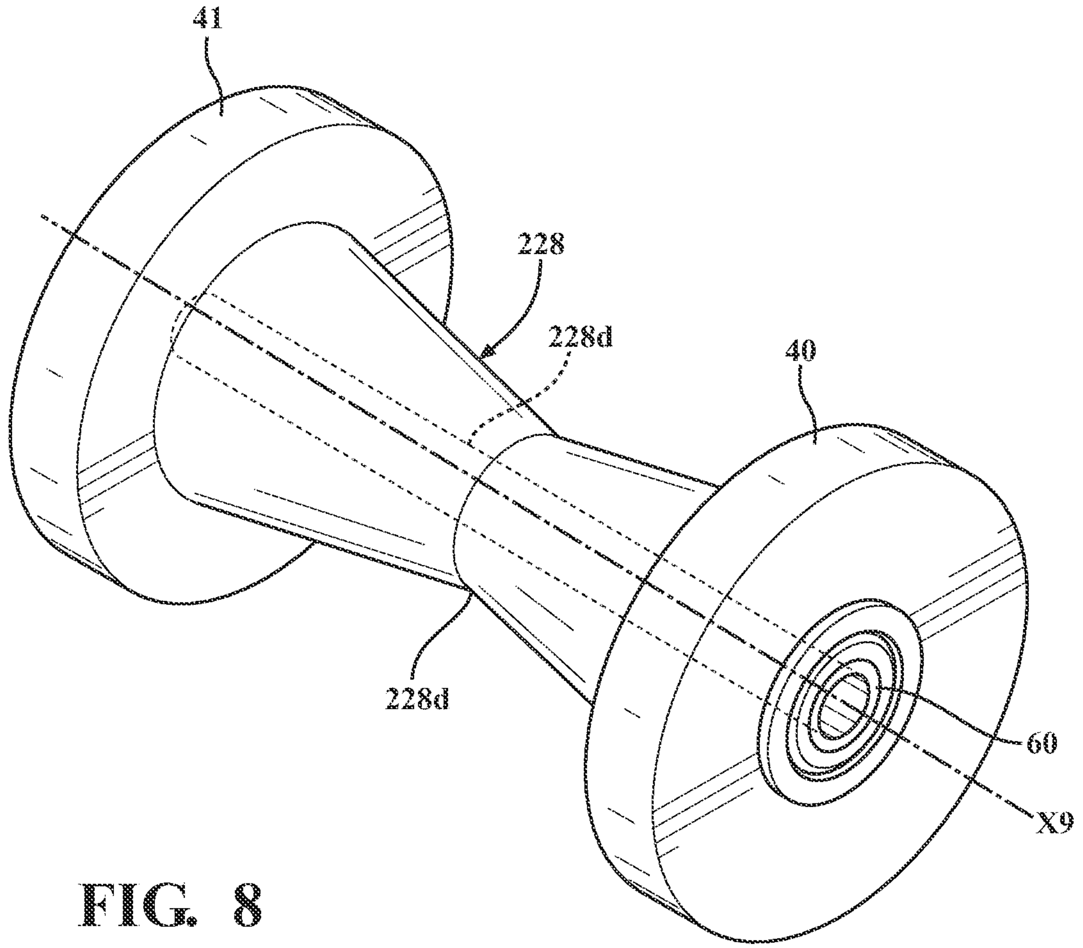
FIG. 8 is a schematic plan view of another alternative embodiment of a support member of the power tool holder.

Referring now to FIG. 8, in a particular embodiment, at least one of the first support member 28 and the second support member 30 may be structured to be rotatable about an associated slot axis of the support member when the support member is secured along the slot. For example, in a support member 228 as shown in FIG. 8, one or more bearings 60 may be provided inside the central opening 228*d* of the support member 228 and the bearing(s) 60 may be supported on a shaft (not shown) extending through the central opening 228*d* and securable to the base 22. Support member 228 may then be rotatable about slot axis X9. Rotatability of the support members when mounted on the base may facilitate user mounting of the power tool on the support members and removal of the power tool from the support members.

FIGS. 4 and 5 show examples of how the tool holder may be configured for different tool holding applications and user preferences. In FIG. 4, the power tool 19 has a relatively long tool bit 71 mounted on a barrel portion 19*c* of the tool 19. For this situation, the tool holder base 122 may be attached to a mounting surface (not shown) in a location where a user can grasp the tool 19 when supported by the tool holder 120. The position of the first support member 28 along the first slot 24 (residing vertically higher that the second slot 26 in this orientation of the base 22) may be adjusted so as to bring the first support member 28 relatively closer to a position from which the user will access or grip the tool 19. The position of the second support member 30 along the second slot 26 (residing vertically lower that the first slot 24 in this orientation of the base 22) may be adjusted so as to move the second support member 30 relatively farther from the user gripping position. The tool 19 may then be positioned in the tool holder 120 so as to support the tool along the bit 71, with a portion of the bit residing relatively closer to the barrel 19*c* supported by an upper surface of the first support member 28, and a portion of the bit residing relatively farther from the barrel 19*c* supported by a lower surface of the second support member 30. When the tool 19 is supported by the tool holder 120, the flanges 40, 42 may prevent the tool 19 from sliding or falling off the support members 28, 30. To position the tool 19 on the tool holder 120 and to remove the tool 19 from the tool holder, the user may rotate and/or shift the position of the tool 19 to enable movement of the tool past the flanges 40, 42 of the first and second support members 28, 30.

Referring to FIG. 5, in another exemplary arrangement, the tool holder 320 may be configured to support a gun-shaped power tool 121 by the grip 121*b* and/or the barrel 121*c* of the tool 121, without a tool bit mounted thereon. In this arrangement, the position of the first support member 28 along the first slot 24 may be adjusted so as to move the first support member 28 relatively farther from a position from which the user will grip the tool. The position of the second support member 30 along the second slot 26 may be adjusted so as to move the second support member 30 relatively closer to the user gripping position. The tool 121 may then be positioned in the tool holder 320 so that a portion of the barrel 121*c* relatively closer to the grip 121*b* is supported by an upper surface of the second support member 30, while a portion of the barrel 121*c* relatively farther from the grip 121*b* is supported by an lower surface of the first support member 28.

Figure 9:
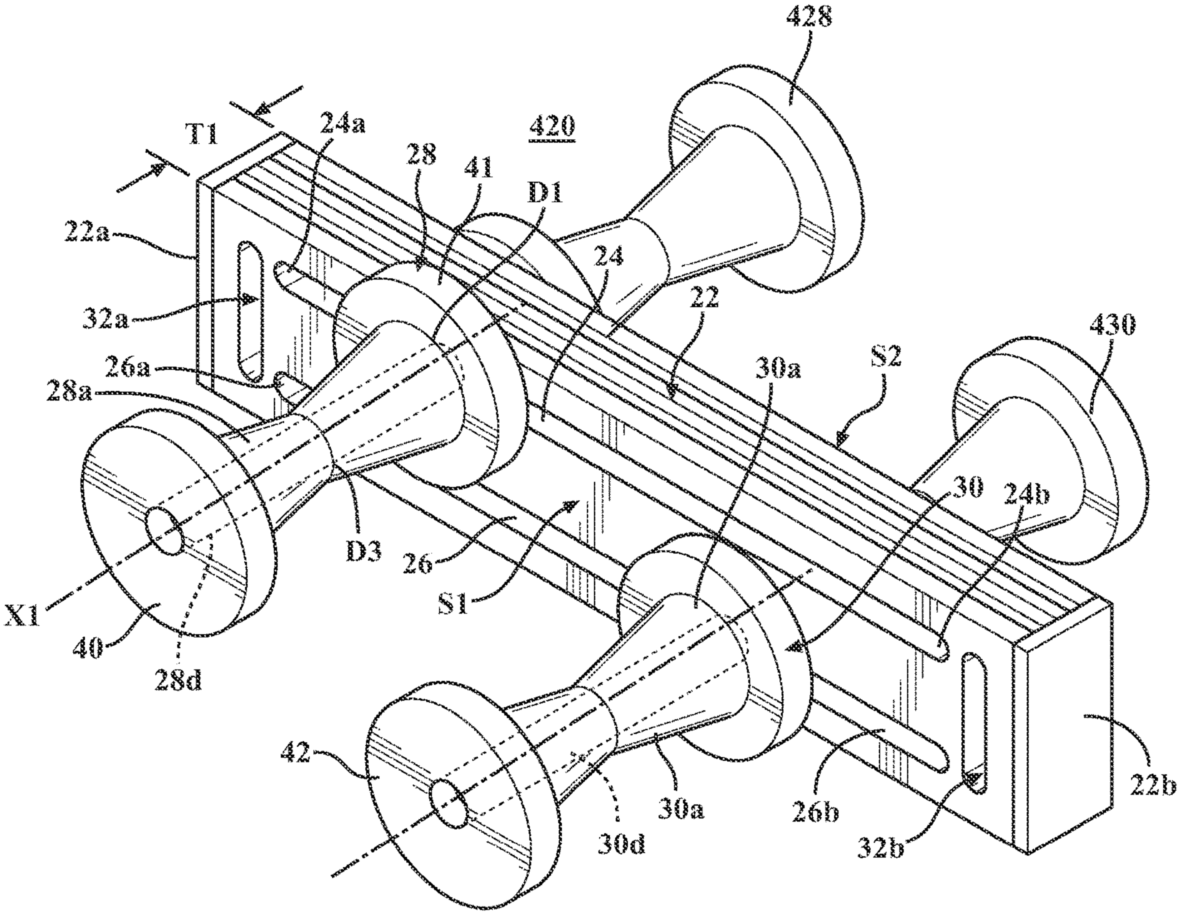
FIG. 9 is a schematic plan view of yet another alternative embodiment the power tool holder, similar to the embodiment shown in FIG. 5.

FIG. 9 is a schematic plan view of yet another alternative embodiment 420 the power tool holder. In addition to support members 28 and 30, the tool holder 420 may further include a third support member 428 structured to be adjustably securable along the first slot 24 and along a second side S2 of the base 22 opposite the first side S1. The tool holder 420 may also include a fourth support member 430 structured to be adjustably securable along the second slot 26 and along the second side S2 of the base 22. A single bolt (not shown) may extend through both the first and third support members 28, 428 to secure the first and third support members to the base 22. Similarly, a single bolt (not shown) may extend through both the second and fourth support members 30, 430 to secure the second and fourth support members to the base 22. This arrangement may enable a pair of similarly-configured, gun-shaped power tools to be supported in a work area side by side, as shown in FIG. 5.

It may be realized from the above description that embodiments of the tool holder described herein may be configurable to any of a variety of arrangements (i.e., including relative positions of the first and second support members along their respective slots, various orientations of the base, etc.) to enable convenient and ergonomic positioning and orientation of a gun-shaped power tool for operation by a user.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A tool holder for a gun-shaped power tool, the holder comprising:

a base including a first slot and a second slot extending parallel to the first slot;

a first support member adjustably securable along the first slot and along a first side of the base;

a first flange mounted on the first support member and having a first outer diameter;

a second support member adjustably securable along the second slot and along the first side of the base; and a second flange mounted on the second support member and having a second outer diameter, wherein the first flange outer diameter and the second flange outer diameter are specified with respect to the distance between the first and second slots so as to prevent alignment of the first and second support members along a plane extending perpendicular to both of the first and second slots.

2. The tool holder of claim 1, further comprising:

a third support member adjustably securable along the first slot and along a second side of the base opposite the first side; and a fourth support member adjustably securable along the second slot and along the second side of the base.

3. The tool holder of claim 1, wherein the first slot has a first end extending to a first end of the base, and a second end extending to a second end of the base opposite the first end of the base.

4. The tool holder of claim 3, further comprising a first end cap structured to close the first end of the first slot, and a second end cap structured to close the second end of the first slot.

5. The tool holder of claim 1, wherein the first slot has a first end spaced apart from a first end of the base, and a second end spaced apart from a second end of the base opposite the first end of the base.

6. The tool holder of claim 1, wherein the first support member includes a body defined by a pair of truncated cones, each truncated cone having a relatively smaller diameter portion and a relatively larger diameter portion, and wherein the truncated cones are joined at their respective relatively smaller diameter portions.

7. The tool holder of claim 1, wherein the first support member has a first end having a first outer diameter and a second end opposite the first end and having a second outer diameter, and wherein the second outer diameter is less than the first outer diameter.

8. The tool holder of claim 1, wherein the first support member has a first end and a second end opposite the first end, the second end having an outer diameter, and wherein the tool holder further comprises a flange mounted at the first support member second end, the flange having an outer diameter greater than the support member second end outer diameter.

9. The tool holder of claim 8, wherein the first support member first end has an outer diameter and the tool holder further comprises another flange mounted at the first end, the other flange having an outer diameter greater than the first support member first end outer diameter.

10. The tool holder of claim 1, wherein each support member has a slot axis, and wherein at least one of the first and second support members is structured to be rotatable about the respective slot axis of the support member after the at least one of the first and second support members has been adjustably secured along the slot.

11. The tool holder of claim 1, further comprising at least one bearing mounted in a central opening of at least one support member of the first and second support members, the at least one bearing being supported on a shaft extending through the central opening and securable to the base along an associated one of the first and second slots, so that the at least one support member is rotatable about a slot axis of the at least one support member when the at least one support member is adjustably secured to the base along the slot.

* * * * *